Feb. 20, 1962   B. B. PARSHALL ETAL   3,021,796
TRANSFER MECHANISM
Filed Jan. 9, 1959   12 Sheets-Sheet 1

B. B. PARSHALL ETAL

3,021,796

TRANSFER MECHANISM

Filed Jan. 9, 1959

United States Patent Office 3,021,796
Patented Feb. 20, 1962

3,021,796
TRANSFER MECHANISM
Bert B. Parshall, Wood Dale, and Clifford A. Glass, Chicago, Ill., assignors to Link-Belt Company, a corporation of Illinois
Filed Jan. 9, 1959, Ser. No. 785,887
11 Claims. (Cl. 104—172)

This invention relates to propelling systems for floor trucks, and relates more particularly to mechanisms for positively transferring floor trucks from one drive line or chain to another.

The primary object of the invention is to provide mechanism for transferring a floor truck from propelling engagement with one driving chain into a similar engagement with another such chain, and wherein the truck is positively propelled through the transfer mechanism.

Another object of the invention is to provide transfer mechanism of the above mentioned type with which the transfer of each truck will be accomplished automatically without the possibility of stopping of the truck in a position that will prevent its positive transfer.

Still another object of the invention is to provide such a transfer mechanism which includes control means operable to prevent the entry of more than one truck into the transfer mechanism at any one time.

Other objects and advantages of the invention will become apparent by reference to the following specification taken in conjunction with the accompanying drawings.

Figure 3:
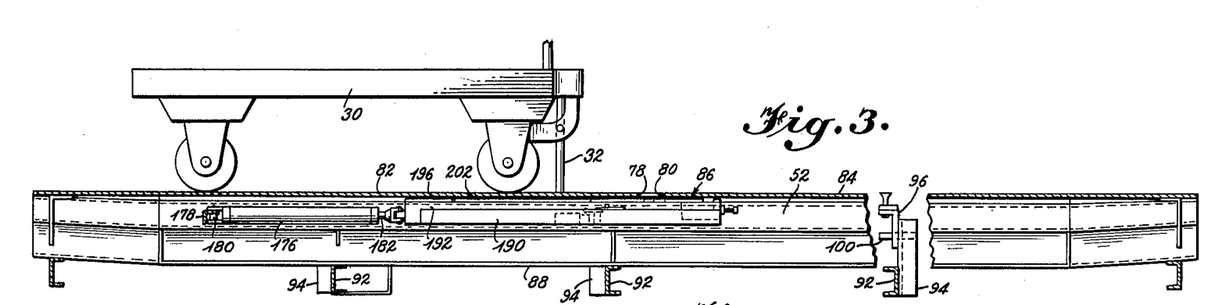
FIGURE 3 is a longitudinal sectional view taken on the line 3—3 of FIG. 1.
Figure 11:
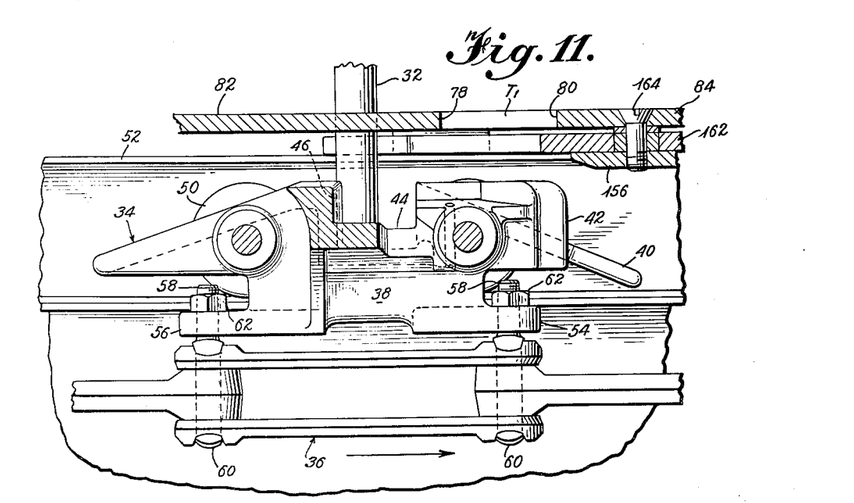
FIGURE 11 is a longitudinal sectional view taken on the line 11—11 of FIG. 8.

The invention is disclosed as being applied to a floor truck propelling system in which the trucks, such as 30 in FIG. 3, are moved along predetermined paths by the engagement between the tow pin 32 of a truck 30 and a driving dog assembly 34 which is attached to a chain 36 located below the floor upon which the trucks 30 travel. As shown in FIG. 11, for example, the tow pin 32 projects below the floor into the path of movement of the pusher dog assembly 34. The tow pin 32 is mounted upon the truck 30 in such a manner that it may be moved vertically into and out of engagement with a pusher dog assembly. Details of the structure for permitting such movements of the tow pin form no part of the present invention; however, reference is made to the United States Patent No. 2,619,370, granted to E. J. Lejer on November 25, 1952, for an example of one such form of structure.

The construction of the pusher dog assembly 34 is shown in detail in FIGS. 15 through 18 inclusive. Each of the assemblies 34 includes a body 38 which is preferably formed from an integral casting. At the forward end (right-hand end in FIGS. 15 and 16) a downwardly and forwardly inclined pivoting apron 40 is provided to slidably engage the lower end of a tow pin 32 when the latter depends into the path of an assembly to transfer the pin smoothly into a position where it may be engaged by the driving surface of the assembly. On each side of the apron 40, inwardly converging wings 42 are located to deflect the drive pin laterally toward the longitudinal center line of the carriage during its travel up the inclined surface of the apron 40.

Figure 18:
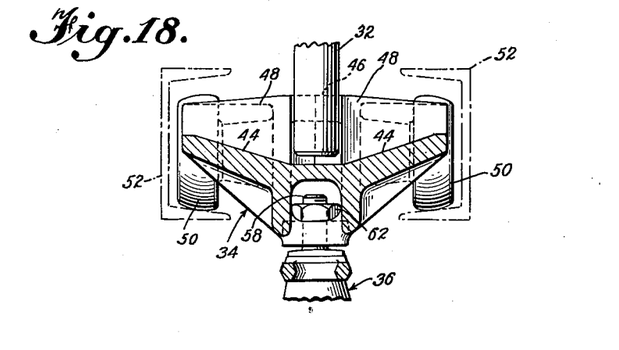
FIGURE 18 is a transverse sectional view of the pusher dog assembly taken on the line 18—18 of FIG. 16.

To the rear of the wings 42, the body 38 is provided with a pin retaining saddle, the upper surface of the body 38 being inclined inwardly and downwardly toward the longitudinal center line as at 44 in FIG. 18. The tow pin engaging surface projects vertically from the rear of the saddle and is formed with a shallow notch 46 within which the tow pin 32 is seated when in driving engagement with the dog assembly. From each side of the notch 46, a vertical surface 48 extends outwardly to the sides of the body 38. The surfaces 48 diverge away from the shallow notch 46 of the assembly and serve to drive the tow pin 32 through the initial portion of the transfer path as the pin is removed from the dog during operation of the transfer device, as described below.

Figure 16:
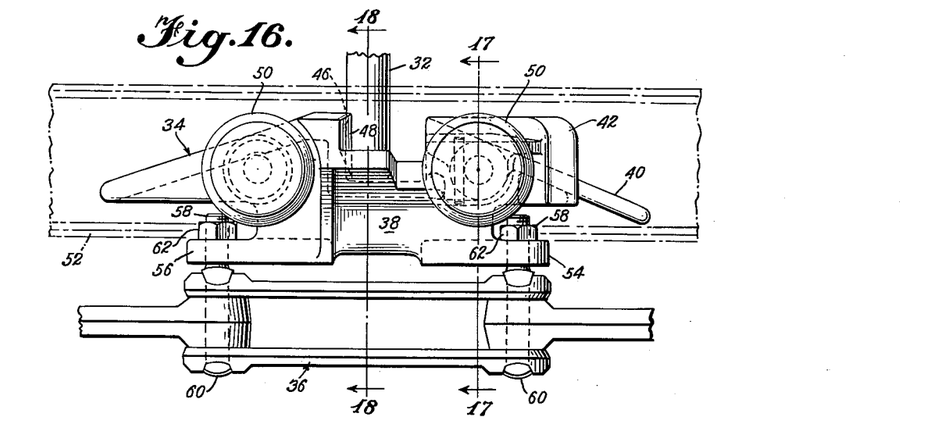
FIGURE 16 is a side elevational view of the pusher dog assembly of FIG. 15.
Figure 17:
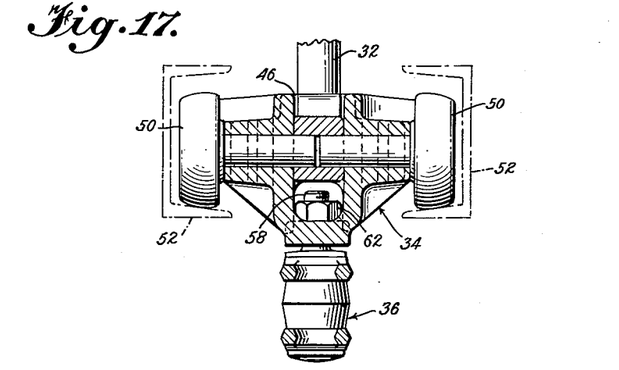
FIGURE 17 is a transverse sectional view of the pusher dog assembly taken on the line 17—17 of FIG. 16.

The pusher dog assembly 34 is supported and guided for movement by four symmetrically located wheels 50 rotatably mounted on the body 38 and adapted to engage and ride upon rails which may be conveniently defined by opposed channel members 52. At each end of the assembly, horizontally extending lugs 54 and 56 are provided for attaching the assembly to the drive chain 36. As best seen in FIGS. 11 and 16, extensions 58, formed on a pair of adjacent chain pins 60, are received in suitably located apertures in the respective lugs 54 and 56 and are secured to the lugs by nuts 62 threaded on the extensions 58.

Figures 19, 20, 23:
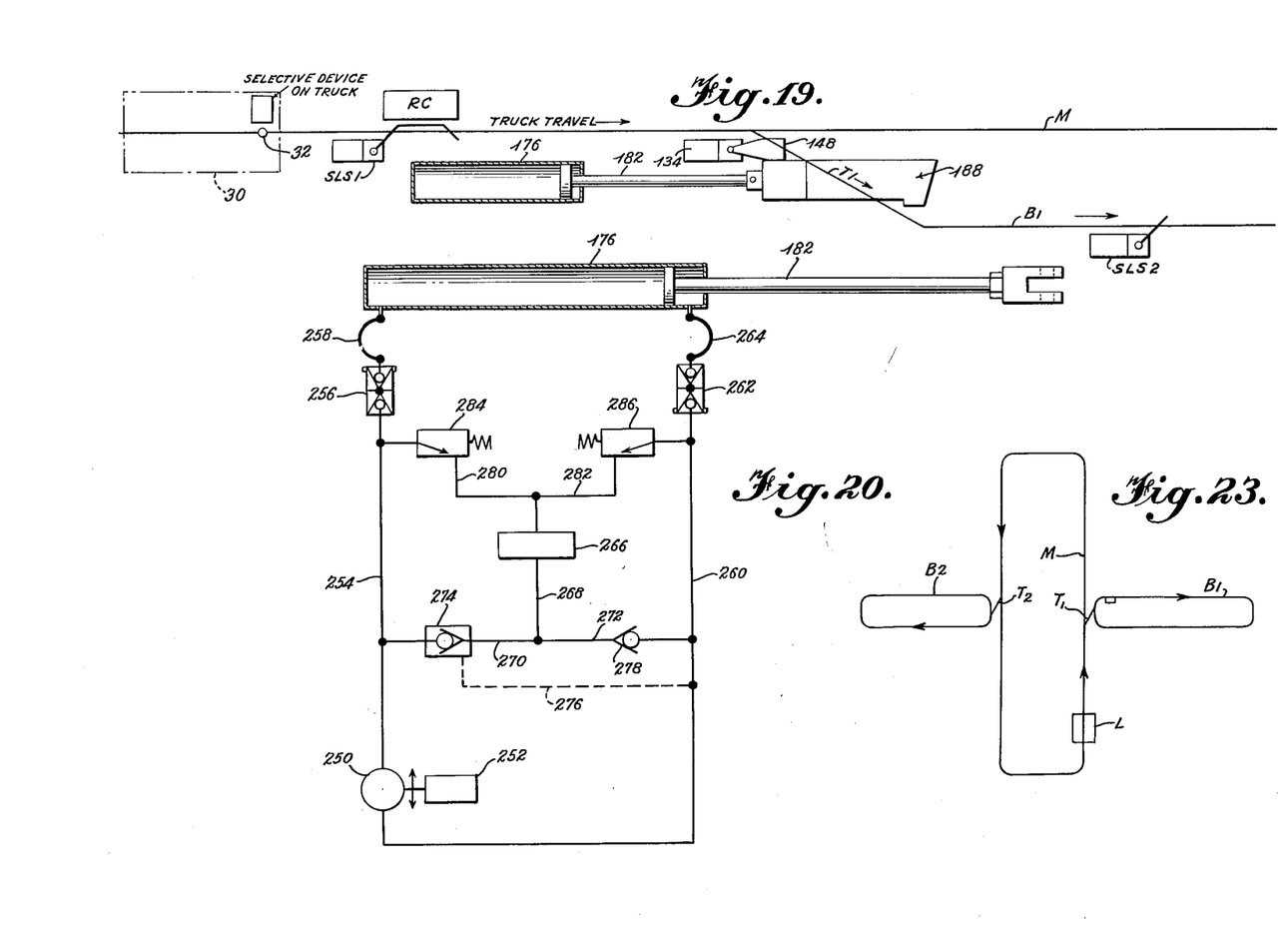
FIGURE 19 is a schematic view of the transfer mechanism showing the relationship between various mechanical parts thereof and certain elements of the electrical control circuit.
FIGURE 20 is a schematic view of the hydraulic system employed to actuate the transfer mechanism.
FIGURE 23 is a diagrammatic view of a typical layout of a conveyor system embodying the invention.

It will be appreciated that the endless chain 36 operates in a closed path below the level of the floor upon which the trucks travel. The transfer device of the present invention is for use in a system where a plurality of separate endless chains are employed as, for example, in a warehouse where one endless chain may propel trucks along a main path from which the trucks may be transferred to any of a plurality of branch paths, an individual endless chain being associated with each branch path. One example of such a system is schematically illustrated in FIG. 23 wherein loaded trucks are conveyed along a main path M and may be selectively transferred to either of the branch paths B1 or B2 by causing the tow pins 32 of the trucks to be shifted from the main path M at either of the transfer points T1 or T2. In such a system, three endless chains with associated pusher dog assemblies would be provided, one for each of the respective paths M, B1 and B2. The three separate chains may be independently driven, although in some cases it is desirable to synchronize the driving movement of the chains in the respective paths.

Figure 1:
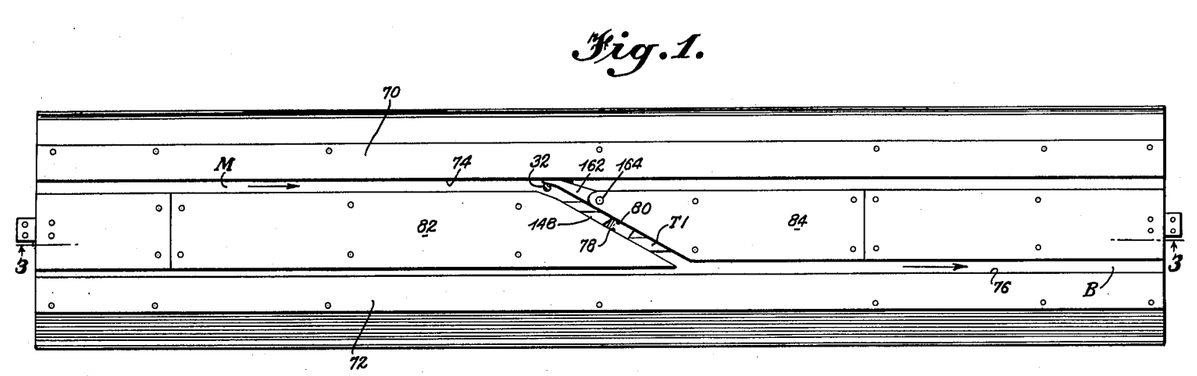
FIGURE 1 is a plan view of a transfer apparatus embodying the present invention.
Figure 12:
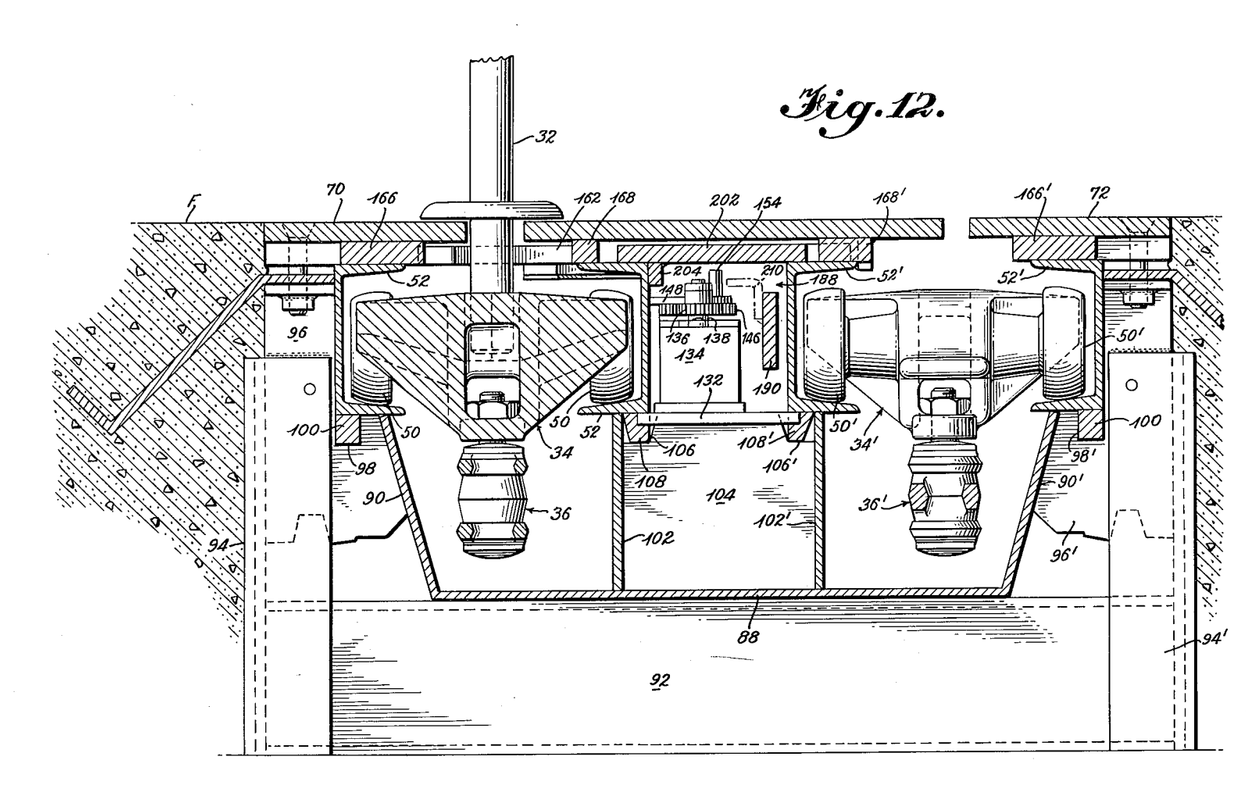
FIGURE 12 is a transverse sectional view taken on the line 12—12 of FIG. 8.

All portions of the tracks for the various paths are provided with cover plates 70 and 72, see FIGS. 1 and 12, which are spaced from each other along their inner edges to define a tow pin guide slot continuous with the slots 74 or 76 of FIG. 1. The upper surfaces of the cover plates are flush with the surface F of the floor, see FIG. 12, upon which the wheels of the floor trucks 30 are supported. The slots 74 and 76 are aligned with the path of the chain which they overlie and are of a width only slightly greater than the diameter of the tow pin in order that the walls of the slots may maintain the tow pin 32 centrally located and seated within the shallow notch 46 of the pusher dog assembly.

FIG. 1 is a plan view of a transfer station at which the tow pin of a floor truck may be transferred from driving engagement with one chain into driving engagement with another chain. It will be assumed that this transfer station is that at which trucks may be transferred from the main line M of FIG. 23 to the branch line B1. As indicated, the main line M and the branch line B1 extend through the transfer station in parallel adjacent paths, the chains below the respective paths M and B1 being driven in the direction of the arrows located on the paths. The paths M and B1 are joined by the transfer path T1 which is partially defined by the opposed inclined edges 78 and 80 of the central cover plates 82 and 84, respectively. Since the chain, the dog assemblies, and the track sections associated with both of the paths M and B1 are of similar construction, the same reference numerals will be employed to designate similar parts, those parts associated with the path B1 being identified by the addition of a prime (') symbol to each reference numeral.

Figure 2:
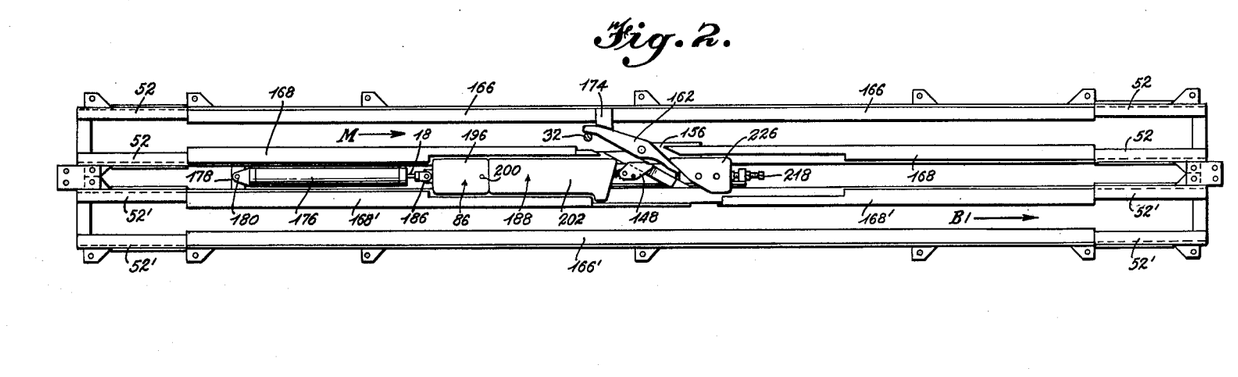
FIGURE 2 is a view similar to FIG. 1 with certain cover plates removed.

FIG. 2 shows the assembly of FIG. 1 with the various cover plates removed to expose the upper surfaces of the rails 52 associated with the main line M and the similar rails 52' of the branch line B1. The operating parts of the transfer mechanism, designated generally 86, are disposed within the space between the innermost rails 52 and 52' of the respective paths.

As best seen in FIG. 12, the various parts of the transfer mechanism operate within an elongated troughlike box which includes a bottom plate 88 extending the entire length of the transfer mechanism. At each side of the bottom plate 88, upwardly and outwardly inclined side plates 90 and 90' are located which may be integral with the bottom plate 88 or may be welded thereto. Secured, as by welding, to the lower surface of the bottom plate 88 are a plurality of transversely extending channel members 92, see FIGS. 3 and 12. At each end of the channels 92, an upwardly projecting angle member 94, 94' is secured, as by welding. Clamping plates 96, 96' are secured to the legs of the angles 94, 94', respectively, and are shaped along their inner edges to conform to the outermost sides of the rail sections 52, 52' and the inclined outer surface of the side plates 90, 90'. The plates 96, 96' may be notched as at 98, 98' to receive a short length of square bar stock 100 to assist in supporting the outer rail sections 52, 52'.

A pair of spaced longitudinally extending center plates 102, 102' are welded to the upper surface of the bottom plate 88 and extend the entire length of the transfer mechanism. At selected longitudinally spaced positions, which may be in transverse alignment with the plates 96, 96', vertically extending transverse bracing plates 104 may be welded between the plates 102, 102'. At their upper ends, the plates 104 are notched as at 106, 106' to receive short lengths of bar stock 108, 108' which supportingly engage the lower surfaces of the inner rails 52, 52', respectively.

Figure 4:
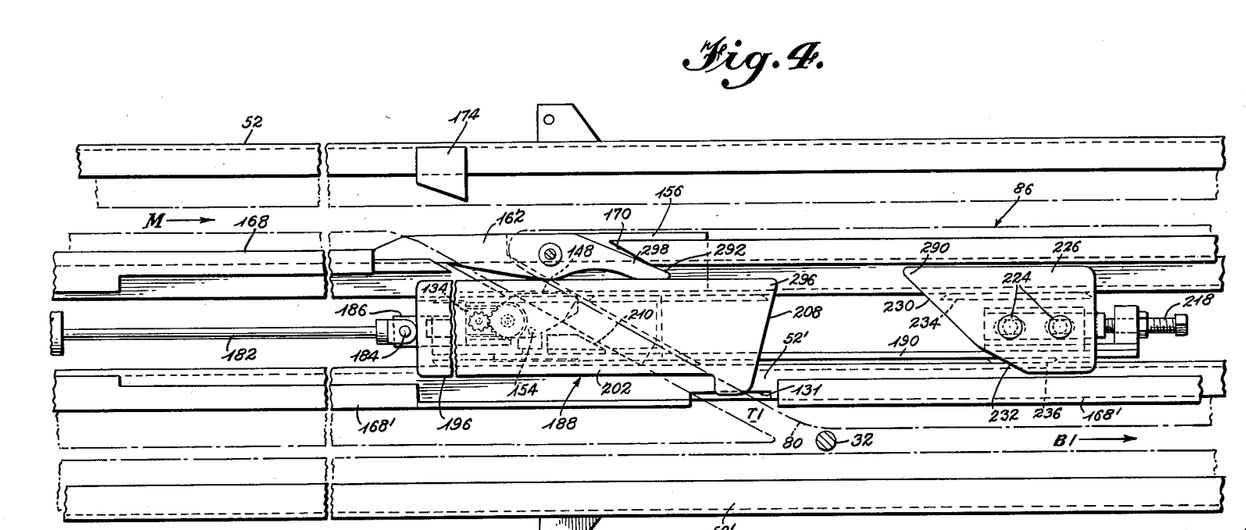
FIGURE 4 is an enlarged plan view of a portion of the mechanism as shown in FIG. 2, but with certain parts in different operating positions.
Figure 5:
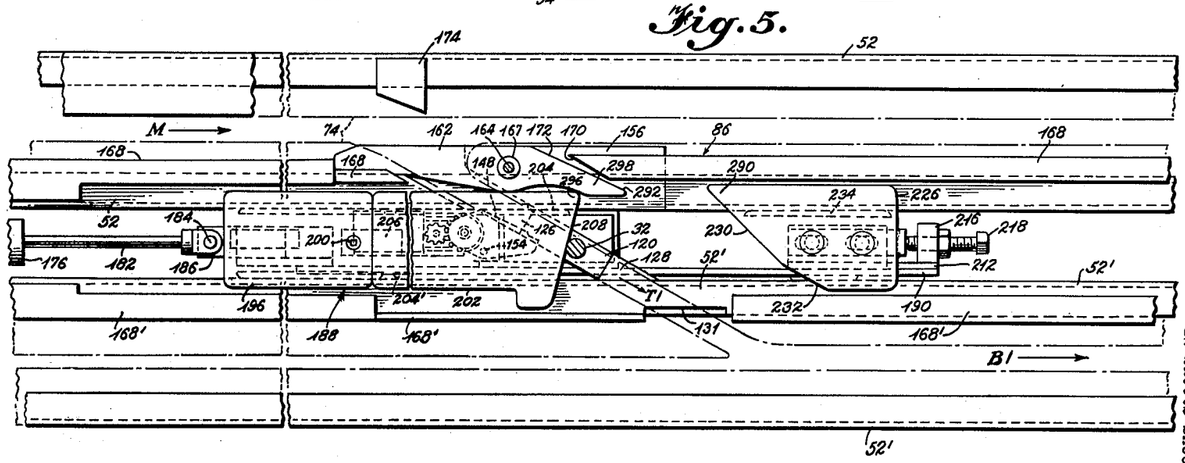
FIGURE 5 is a view similar to FIG. 4, but showing the parts in still another operating position.
Figure 6:
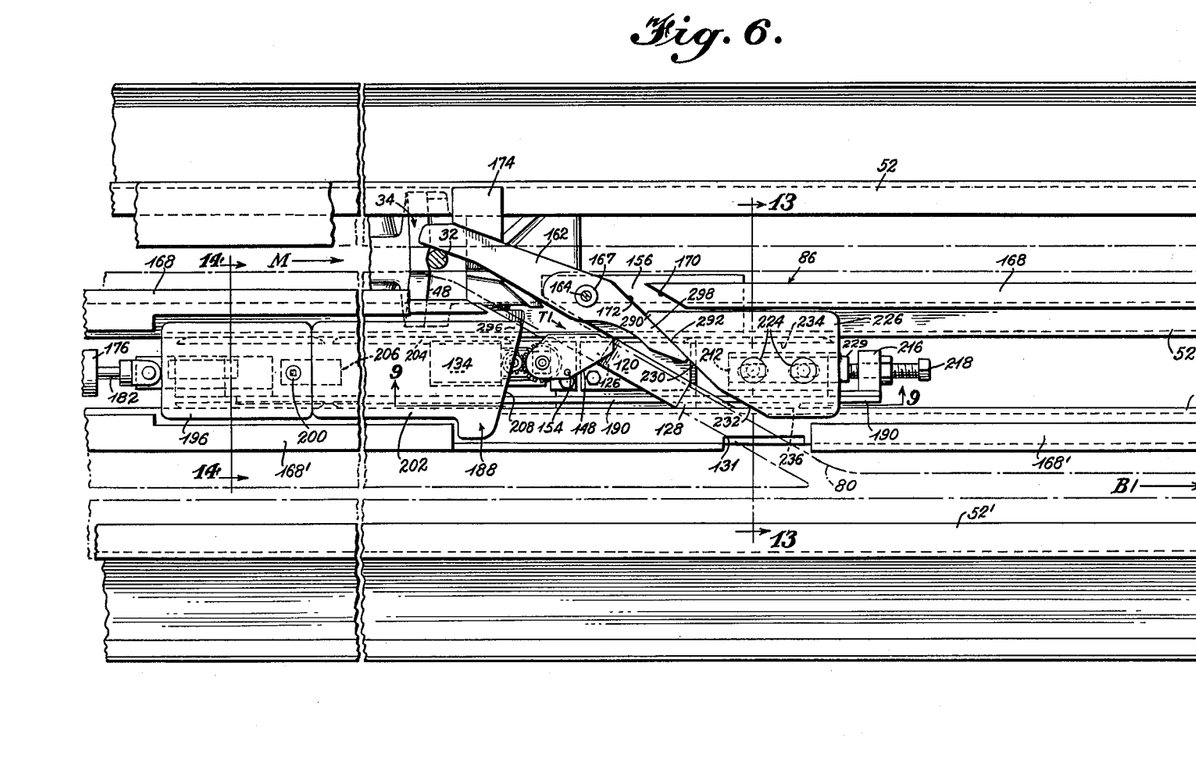
FIGURE 6 is an enlarged plan view showing the parts in the same position as in FIG. 2.
Figure 8:
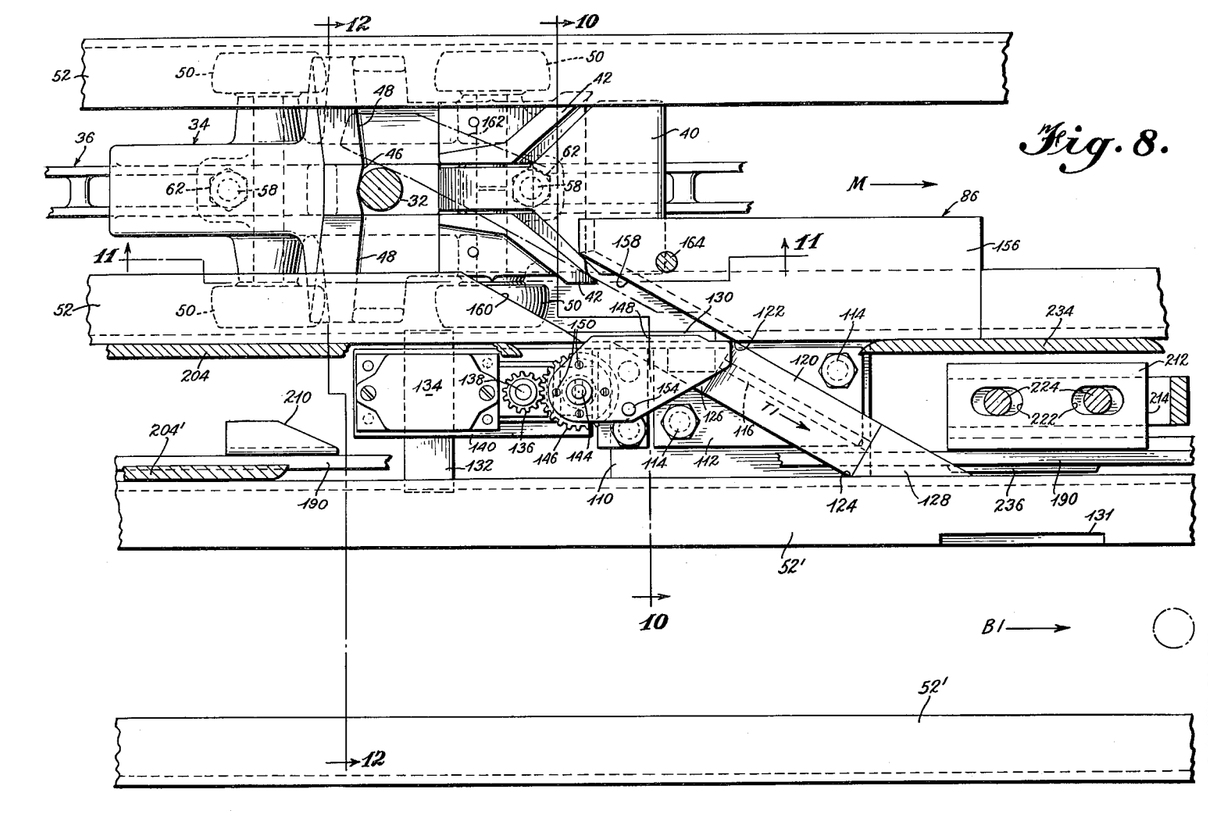
FIGURE 8 is an enlarged plan view similar to FIG. 6, but with certain additional parts removed to more clearly show certain features of the mechanism.
Figure 9:
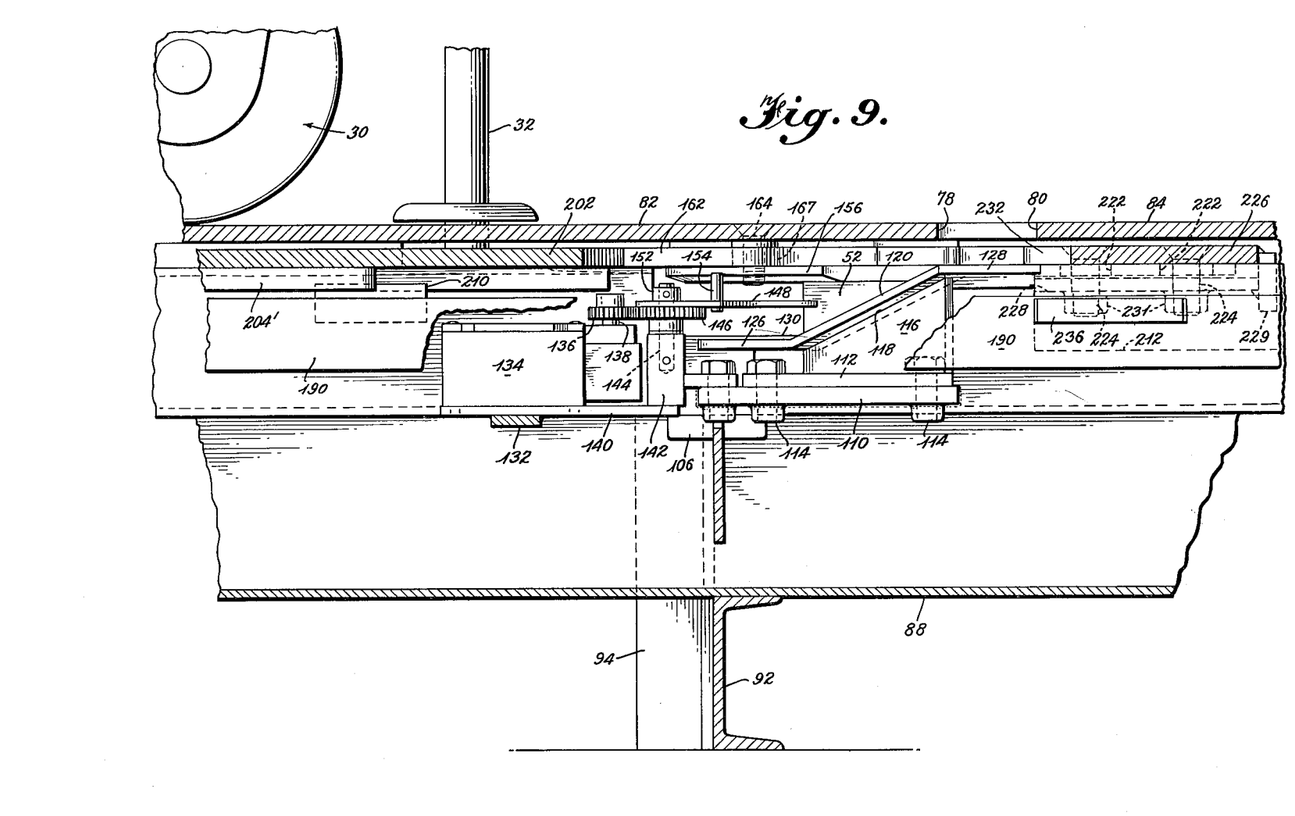
FIGURE 9 is a longitudinal, vertical sectional view taken on the line 9—9 of FIG. 6.
Figure 10:
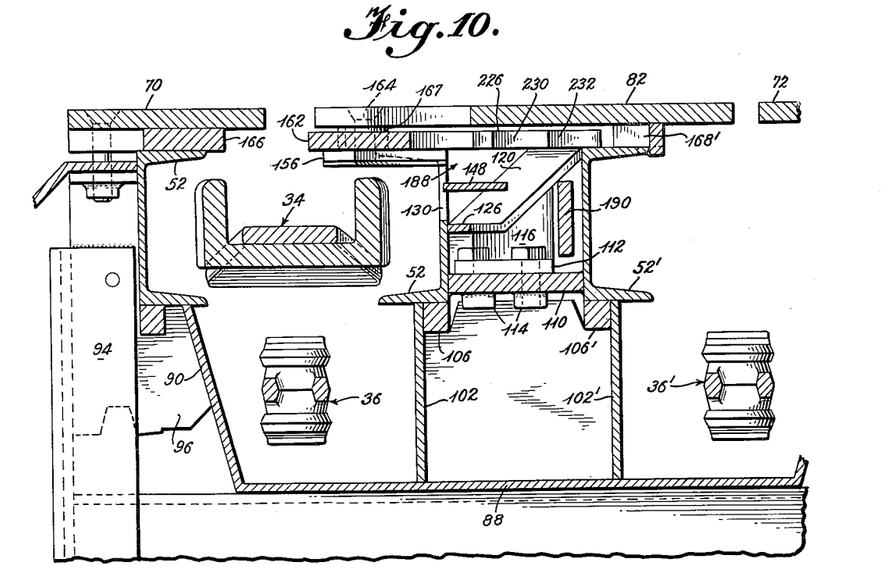
FIGURE 10 is a transverse sectional view taken on the line 10—10 of FIG. 8.

Referring now to FIGS. 8 through 10, a track spacer plate 110 is welded between the facing vertical surfaces of the innermost rails 52 and 52'. A rectangular ramp base plate 112 is mounted upon the upper surface of the spacer plate 110 and is secured thereto by two nut and bolt assemblies 114. A vertical ramp support plate 116 is welded to the upper surface of the base plate 112. The plate 116 has an inclined upper edge 118, see FIG. 9, upon which is welded a ramp 120 which extends diagonally across the space between the facing inner surfaces of the innermost rails 52 and 52'. As best seen in FIGS. 8, the ramp 120 is a rectangular plate with one corner 122 touching the inner surface of the inner rail 52 and the diagonally opposed corner 124 touching the inner surface of the opposed inner rail 52'. A horizontal triangular plate 126 fills the space between the lower end of the ramp and the side wall of the rail 52, while a similar horizontal triangular plate 128 is secured to fill the space between the opposite end of the ramp 120 and the inner side surface of the inner rail 52'. The ramp assembly is so located that the longitudinal center line of the rectangular ramp 120 corresponds to the center line of the transfer path T1 and that the upper surface of the triangular filler plate 128 is coplanar with the upper surface of the upper flange of the inner rail 52'. As best seen in FIG. 10, the inner rail 52 is notched as at 130 to provide a rectangular opening through which the tow pin 32 of a floor truck may pass from the path M onto the upper surface of the triangular filler plate 126. Also, as seen in FIGS. 4, 5 and 6, the upper flange of the inner rail 52' is cut away as at 131 to permit a tow pin 32 passing over the flange to drop through the cut out 131 into the path of pusher dog assemblies travelling along the path B1. The dimension of the cut out 131 transversely of the rail 52', however, is such that a sufficient portion of the upper flange of the rail 52' is maintained to guide the tow pin over the wheels of any pusher dog assembly that might be passing the location of the cut out 131 before the pin is dropped.

A switch supporting strap 132 is welded between the innermost rails 52 and 52' at a location spaced from the lefthand end (FIGS. 8 and 9) of the track spacer 110. A limit switch 134, mounted upon the strap 132, is of conventional construction with the exception that the operating lever is replaced by a spur gear 136 which is fixedly mounted upon the rotating contact operating shaft 138. A special switch mounting bracket 140 extends beyond the operating end of the limit switch 134 to support a block 142 which is secured to the bracket 140 as by welding. A fixed stub shaft 144 projects upwardly from the top of the block 142 to define an axis about which a spur gear 146 may rotate freely. As best seen in FIG. 8, the gear 146 is in mesh with the switch operating gear 136.

An arm 148 is fixedly secured to the spur gear 146 as by screws 150. The assembled gear 146 and arm 148 are mounted upon the shaft 144 by means of a collar 152 which is secured to the shaft 144. A vertically projecting pin 154 is welded within a hole in the arm 148. As best seen in FIG. 8, the arm 148 normally projects across the transfer path T1. Passage of a tow pin 32 along the path T1 causes the arm 148 to be rotated in a clockwise direction from the position shown in FIG. 8 to that shown in FIG. 5. The limit switch 134 requires the application of a force to move the arm 148 from either of its ultimate positions. The purpose of the pin 154 is to engage other elements of the transfer mechanism during their movement to return the arm 148 from the FIG. 5 position to the FIG. 8 position at a suitable stage in the operation.

As best seen in FIGS. 8 and 9, a filler piece 156 is mounted upon the inner rail 52 on the downstream side of the transfer path. The filler piece 156 is welded to the rail 52 in a longitudinally extending notch formed by cutting away a portion of the upper flange of the inner rail 52 to make the upper surfaces of the rail flange and the piece 156 flush. An inclined edge 158 is formed on the filler piece 156 to define one side of the transfer path T1. As best seen in FIG. 8, the upper flange of the inner rail 52 is cut parallel to the edge 158, as at 160 during the formation of the slot 130.

In addition to defining one side of the slot of the transfer path T1, the filler piece 156 also serves as a supporting plate upon which a pivotal deflector arm 162 is mounted by means of a flat head machine screw 164 which passes through a spacer 167, used to provide space between the cover plate 82 and the filler piece 156 so that the deflector arm 162 may pivot freely, which fits loosely through the deflector arm 162. As best seen in FIG. 9, the screw 164 is also employed to fasten the cover plate 82 to the fixed filler piece 156.

Referring now to FIG. 3, it will be noted that the rails 52 and 52' are located at a level slightly below the normal level of the conventional track sections. As clearly shown in FIG. 12, the rails 52 and 52' are spaced below the bottom surfaces of the cover plates 70 and 72 by the thickness of the filler blocks 166 and 166'. The spacing between the rails 52, 52' and the cover plates 70 and 72 is necessary in order to provide working clearance between the upper surfaces of the inner rails 52 and 52' and the central cover plates 82 and 84 for moving parts of the transfer mechanism to be described below.

The filler blocks 166 and 166' are constructed from ordinary strip or bar stock and may be tack welded to the upper flanges of the associated rails. The filler block employed on the inner rail 52 on the departure side of the transfer path T1 is beveled as at 170, see FIG. 5, to define an abutment for the rear surface 172 of the deflector bar 162 when the latter is located clear of the main path M. The filler blocks 168 and 168' are located at suitable positions to permit unimpeded movement of the various operating parts of the transfer mechanism. Opposite the approach end of the transfer path T1, an abutment block 174 is secured to the upper surface of the outer rail 52 to provide a backstop for the deflector bar 162 when the latter is in its tow pin intercepting position (see FIG. 6).

As shown in FIGS. 2, 3, 5 and 7, the transfer device 86 includes a reversible fluid motor 176 which is coupled to a fixed channel member 178 by means of a pin 180. The piston rod 182 of the motor 176 is pinned as at 184 to a rearwardly projecting lug 186 of a slide member designated generally 188.

Figure 7:
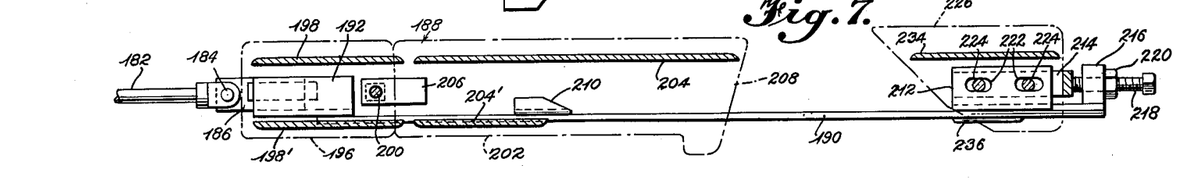
FIGURE 7 is a longitudinal, sectional view of the slide assembly of the transfer mechanism shown in FIG. 4.

As best seen in FIG. 7, the slide member 188 includes an elongated rigid bar 190 which extends the entire length of the member 188. The lug 186 is secured to the bar 190 by means of a short length of angle section 192 (FIG. 14) having a block 194 welded to its upper flange. The lug 186 is welded to the other leg of the angle section and to the block 194 to provide a rigid connection between the bar 190 and the piston rod coupling lug 186.

Figure 14:
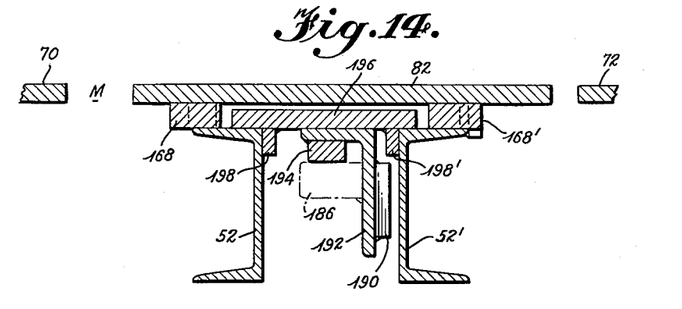
FIGURE 14 is a transverse sectional view taken on the line 14—14 of FIG. 6.
Figure 15:
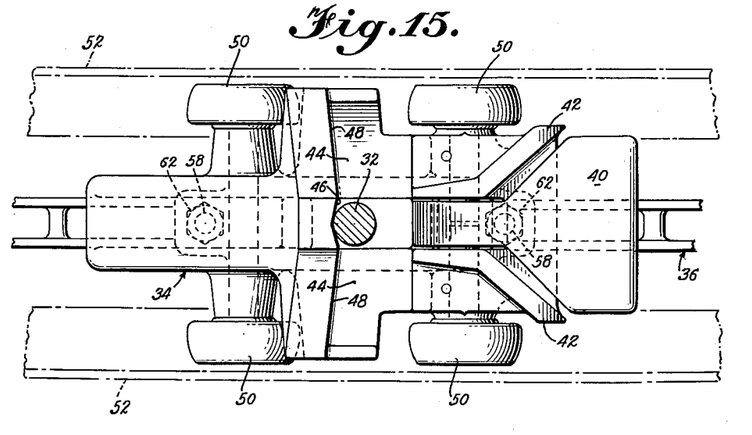
FIGURE 15 is a plan view of a pusher dog assembly employed to transmit motion from the drive chain to the tow pin of a floor truck.

At the rear end of the bar 190, and overlying the forward end of the piston rod coupling lug 186 and the angle section 192, a generally rectangular plate 196 is rigidly secured, as by welding, to the angle section 192. As best seen in FIG. 14, the plate 196 extends entirely across the space between the inner rails 52 and 52' and is slidably supported upon the upper surface of the inner rails. To guide the assembly in its movements longitudinally of the rails 52 and 52', a pair of spaced guide lugs 198, 198' are welded to the lower surface of the plate 196 to engage the vertical inner sides of the inner rails 52 and 52'.

At its forward end, the plate 196 is drilled to receive a bolt 200 by means of which a ram plate 202 is secured to the above described parts of the slide member assembly 188. The width of the ram plate 202 is such that it overlies and is slidably supported upon the upper surfaces of the inner rails 52 and 52'. Lugs 204 and 204', see FIG. 8, are welded to the lower surface of the plate 202 to engage the inner vertical surfaces of the rails 52 and 52' to thereby guide the plate 202 in its sliding movement longitudinally of the rails 52 and 52'.

At its rearward end, the plate 202 is provided with an attachment plate 206 which is welded to its lower surface and projects rearwardly therefrom. The attachment plate 206 is drilled to receive the screw 200 and may either be tapped or provided with a welded nut to threadably attach the plate 202 to the plate 196. The forward edge of the plate 202 is inclined as at 208 whereby movement of the slide assembly from left to right causes the edge 208 to engage the tow pin 32 of a floor truck to force the pin through the transfer path in a manner best appreciated by reference to FIG. 5.

On the inner surface of the bar 190, see FIGS. 4, 8 and 12, a pin engaging cam plate 210 is secured as by welding. The function of the plate 210 is to engage the pin 154 of the limit switch operating arm 148 to return the arm from the position shown in FIG. 5 to the position shown in FIG. 4 as the slide assembly moves from left to right in FIGS. 4 and 5.

Figure 13:
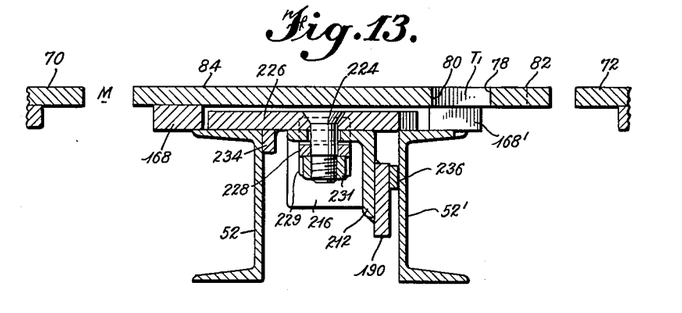
FIGURE 13 is a transverse sectional view taken on the line 13—13 of FIG. 6.

At the forward end of the bar 190, a second angle section 212, see FIG. 13, is secured as by welding. The upper leg of the angle section 212 is cut away as at 214, see FIG. 7, to provide clearance for certain operating parts as follows. A lug 216 is welded to the section 212 and drilled and tapped to receive an adjusting bolt 218 which also carries a lock nut 220 to secure the bolt to the lug 216 at selected adjusted positions. The horizontal leg of the section 212 is provided with a pair of longitudinally elongated openings 222 which are dimensioned to receive a pair of clamping bolts 224 which are employed to secure a sliding plate 226 to the assembly. The width of the plate 226 is such that it is slidably supported upon the upper surfaces of the inner rails 52 and 52' as best seen in FIG. 13.

The plate 226, see FIGS. 6, 9 and 13, is secured to the angle member 212 by means of a plate 228 which is fastened to the plate 226 by means of a lug 229 welded to both of the plates 228 and 226. The bolts 224 pass through the upper leg of the angle section 212 and through the plate 228 and are threadably received in the nuts 231 welded to the lower surface of the plate 228.

As best seen in FIG. 6, the function of the palte 226 is to engage the pivoting deflector arm 162 to move such arm into the path of a tow pin 32 when the sliding member 188 is moved to its extreme left-hand position by the full retraction of the piston rod 182 into the motor 176. To accomplish this, the edge of the plate 226, which faces the transfer path, is inclined as at 230, see FIGS. 5 and 6. The portion of the edge 230 adjacent the branch path B1 is relieved as at 232 in order to clear the transfer path T1 in the event that the momentum of the truck passing through the transfer path is such as to carry the tow pin 32 completely through the transfer before the transfer mechanism has a chance to operate.

The sliding plate 226 is provided with a guide lug 234, see FIGS. 6 and 13, welded to its lower surface to engage the inner surface of the rail 52. A pad 236 on the outer surface of the bar 190 performs a similar function on the opposite side of the assembly.

As seen in FIGS. 10 and 12, the locations of the bar 190 and the other parts of the slide assembly 188 are such that the assembly clears the fixed parts of the transfer mechanism by passing to the right of the limit switch mechanism 134 and beneath the inclined ramp section 120 between the edge of the plate 116 and the inner rail 52'. Thus, actuation of the fluid motor 176 is effective to move the slide assembly from the position shown in FIG. 2, wherein the piston rod 182 is fully retracted into the cylinder of motor 176, and a position such as that shown in FIG. 4, wherein the piston rod 182 is fully extended.

The hydraulic control system for the motor 176 is schematically shown in FIG. 20. Fluid pressure for opearting the motor 176 is supplied by a reversible pump 250 which is driven by a reversible electric motor 252, both the pump 250 and the motor 252 being of conventional construction. One side of the pump 250 is connected to the head end of the cylinder of the motor 176 by a conduit 254 which includes a hose coupler 256 and a flexible hose section 258. The opposite side of the pump 250 is connected to the rod end of the motor cylinder by means of a similar conduit 260 which likewise includes a hose coupler 262 and a flexible hose section 264. Fluid for operating the system is withdrawn as needed from a reservoir 266 whose outlet 268 is connected to the respective conduits 254 and 260 by the conduits 270 and 272, respectively. The conduit 270 includes a pilot operated check valve 274 which is oriented to prevent the flow of fluid from the conduit 254 to the conduit 268. Pilot pressure for opening the check valve 274 to permit flow through the conduit 270 toward the conduit 268 is obtained through a control conduit 276 which is coupled to the conduit 260. A one-way check valve 278 of conventional construction is connected in the conduit 272 to prevent the flow of fluid from the conduit 260 to the conduit 268.

Both of the conduits 254 and 260 are also connected to the inlet of the reservoir 266 through the respective conduits 280 and 282 each of which includes an adjustable pressure relief valve 284 or 286. Thus, when pressure in either of the conduits 254 or 260 exceeds the setting of the associated pressure relief valve 284 or 286, fluid is returned from the conduit 254 or 260 to the reservoir.

Operation of the hydraulic circuit is as follows: To move the piston rod 182 from the fully extended position shown in FIG. 20 to a fully retracted position, the pump driving motor 252 is energized by the electrical control circuit, to be described below, to drive the pump 250 in a direction to supply pressure through the conduit 260 to the rod end of the cylinder of motor 176. When the pump 250 is driven in such a direction, the pump simultaneously withdraws fluid from the head end of the cylinder through the conduit 254. Thus, the effective flow of the fluid in the circuit during retracting movement of the piston rod 182 is from the head end of the cylinder to the rod end. Since the volume of fluid necessary to drive the piston rod toward its retracted position is smaller than the volume of fluid withdrawn from the head end of the motor cylinder, by virtue of the piston rod 182, less fluid is required to be supplied to the rod end of the cylinder than is withdrawn from the head end. Thus, the excess fluid may be returned to the reservoir through the pilot operated check valve 274 which is unseated during this operation by control pressure conducted to the valve from the conduit 260 by means of the conduit 276. Should excess pressure build up in the rod end of the cylinder, as would be the case if the pump driving motor 252 continued to operate after the rod 182 was fully retracted into the motor cylinder, the excess fluid is conducted to the reservoir through the pressure relief valve 286 and the conduit 282.

To return the rod 182 from its fully retracted position to the position shown in FIG. 20, the pump driving motor 252 is actuated to drive in the reverse direction to supply fluid under pressure to the conduit 254 and to withdraw fluid from the rod end of the cylinder through the conduit 260. The additional amount of fluid needed in this operation to compensate for the volume of the piston rod 182 is withdrawn from the reservoir 266 through the conduits 268, 272 and the check valve 278. The building up of excess pressure in the conduit 254 is prevented by the pressure relief valve 284 which opens when a predetermined pressure exists in the conduit 254 to permit fluid to flow from the conduit 254 to the reservoir 266 by means of the conduit 280.

The electrical control wiring system for operating the transfer device is shown with the various circuit elements in the condition which they assume when the piston rod 182 of the fluid motor 176 is fully extended and no truck is present in the transfer station, as shown in FIG. 19. As a truck approaches the transfer station, the tow pin 32 strikes the arm of a limit switch SLS1 to momentarily close the contacts SLS1a, see FIG. 22. If the selective device on the floor truck is set to effect the routing of the truck through the transfer station to another of the chains, the transfer cycle initiating device RC is actuated to close the contacts RCa simultaneously with the closing of the contacts SLS1a by the tow pin of the truck.

The simultaneous closing of these two contacts completes a circuit across the supply lines of the wiring system through the normally closed contacts 134a and a time delay opening relay TRF. Energization of the relay TRF immediately closes its asssocciated contacts TRFa to energize the pump motor control relay PMF which in turn closes the normally open contacts PMFa, PMFb and PMFc, see FIG. 21, to energize the pump motor 252 to drive the pump 250 in a direction supplying fluid to the fluid motor 176 to retract the piston rod 182 into the cylinder, thereby conditioning the transfer device to intercept the tow pin 32 with the parts in the position shown in FIGS. 2 and 6.

As the truck passes beyond the limit switch SLS1 and the initiating device RC, the contacts SLS1a and RCa are opened immediately. However, the consequent deenergization of relay TRF has no immediate effect on the pump control circuit since the contacts TRFa remain closed for a period of time sufficient to permit the pump 250 to fully retract the piston rod 182 of the fluid motor 176.

The limit switch SLS1 and the transfer cycle initiating device RC are located a sufficient distance in advance of the transfer point to permit the transfer device to shift the parts from the positions shown in FIG. 4 to the positions of FIG. 2 and 6 by the time a tow pin arrives at the transfer point. The tow pin is then deflected into the transfer path and travels therealong to rotate the striker 148 of limit switch 134 a sufficient distance to open the contacts 134a and close the normally open contacts 134b (see FIG. 22). Closing of the contacts 134b energizes a second time delay opening relay TRR and a latching relay LR2A which is connected in parallel with the relay TRR.

Energization of the relay TRR closes its contacts TRRa to energize a second pump motor control relay PMR which, when energized, closes contacts PMRa, PMRb and PMRc to connect the pump motor 252 to drive the pump 250 in a reversed direction from that described above. Both of the pump motor control relays PMF and PMR are connected in series with normally closed contacts PMRd and PMFd, respectively, in order that the control relays cannot be simultaneously energized.

As the pump is driven in the reversed direction by this closing of the contacts PMRa, PMRb and PMRc, the piston rod of the fluid motor 176 is driven to its extended position for driving the slide member 188 from the position of FIG. 6 to the position of FIG. 4, thereby driving the tow pin completely through the transfer path and into the path of the second chain. As the tow pin arrives in the path of the second chain, it is engaged by a dog on the second chain and driven away from the transfer path into contact with the striker of limit switch SLS2 (FIG. 19) to close contacts SLS2a (FIG. 22) to momentarily energize latching relays LR1B and LR2B.

The function of the latching relays LR1A, LR1B, LR2A and LR2B is to make certain that a truck transferred from one driving chain to the other has passed completely through the transfer station before another truck enters the transfer station. To accomplish this function, the latching relay LR2A is energized when the tow pin of a truck being transferred enters the transfer path and deflects the striker 148 of the limit switch 134. Energization of the relay LR2A closes its associated contacts LR2a which are connected in series with latching relay LR1A and the limit switch contacts SLS1a. The relay LR2A remains energized until the fluid motor completes its stroke to fully extend the piston rod at which time the striker of the limit switch 134 is actuated to open contacts 134b and close contacts 134a. Should a second truck enter the transfer station before contacts LR2a are opened, the second truck will engage the striker of the limit switch SLS1 and close the contacts SLS1a to thereby energize the latching relay LR1A. Energization of the relay LR1A opens the normally closed contacts LR1a which are connected in series with the circuit of the driving chain motor 287 for the main line M to thereby stop driving movement of the chain to prevent the second truck from being driven into the transfer station. Energization of the relay LR1A also closes the contacts LR1b which may be connected to a light IL or other indicator.

Once they have been closed by the energization of the relay LR2A, the contacts LR2a remain closed until relay LR2B is energized, even though relay LR2A is deenergized. Relays LR2A and LR2B both operate the contacts LR2a, relay LR2A acting to close the contacts while relay LR2B acts to open the contacts. The contact mechanism is such that the contacts remain in the last position to which they have been actuated until the relay which actuates the contacts away from that position is energized. A similar relationship exists between the relays LR1A and LR1B and the contacts LR1a and LR1b. The symbolic designation of the contacts in the drawing are normally open or normally closed contacts corresponds to their respective relationship with relays LR1A and LR2A.

Figure 21:
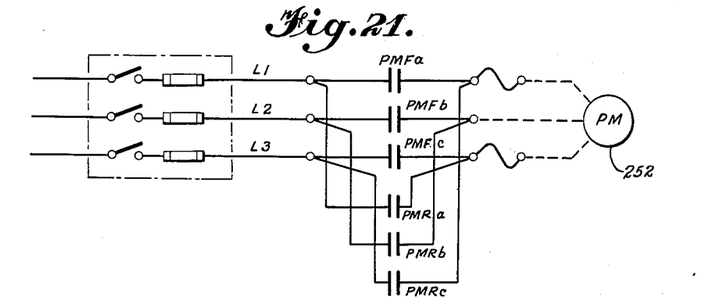
FIGURE 21 is a diagrammatic view of the electrical control circuit for the motor employed to drive the pump of the hydraulic system of FIG. 20.
Figure 22:
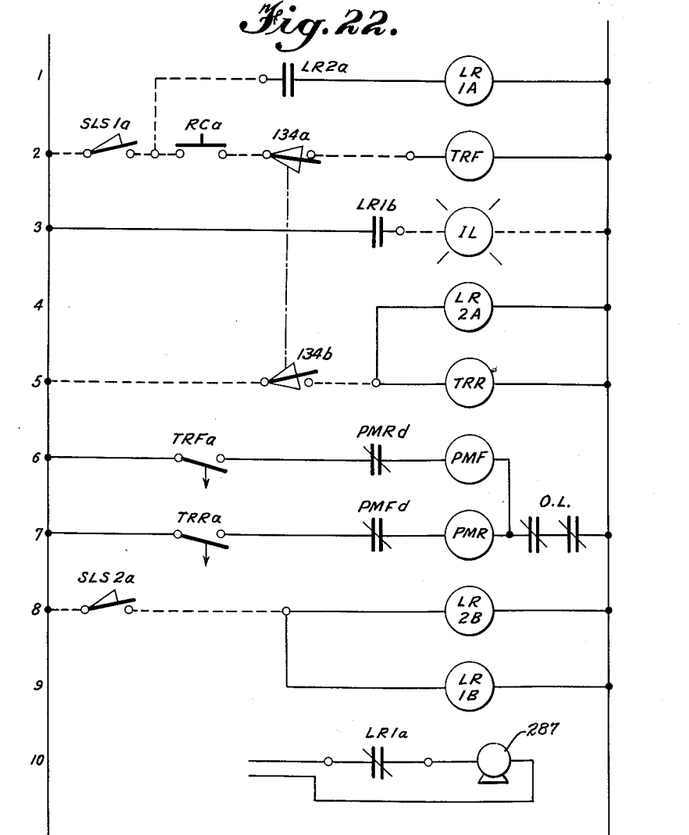
FIGURE 22 is a wiring diagram of the electrical control circuit.

From the foregoing description of the hydraulic control system, it is seen that actuation of the fluid motor 176 is under the direct control of the pump driving motor 252 which in turn is controlled automatically by the electrical wiring system shown in FIGS. 21 and 22. Before discussing the control circuit in detail, it is believed that the function and operation of the same will be more readily understood by first referring to FIG. 19 of the drawings wherein the physical location of the circuit controlling elements is schematically illustrated with respect to the transfer device and the various paths of movement of the truck.

As illustrated in FIG. 19, a first safety limit switch SLS1 is located adjacent the main path M at a point in advance of the intersection of the transfer path T1 and the main path M. The limit switch SLS1 is of conventional construction and is located at one side of the main path M so that the striker of the limit switch projects into the path of the tow pins 32 traveling along the main path M. A similar safety limit switch SLS2 is located adjacent the branch path B1 beyond the intersection of the transfer path T1 and the branch path B1 and is positioned so that the striker of the switch SLS2 will be actuated by a tow pin 32 as the truck is conveyed along the branch path B1. The functions of the safety limit switches SLS1 and SLS2 are to respectively signal the entrance and exit of a truck to and from the transfer station.

Located adjacent the limit switch SLS1, is a selectively operable transfer cycle initiating device RC. It will be appreciated that in the illustrated system some trucks 30 will be driven to a destination on the main line M beyond the transfer station while certain selected trucks 30 will be routed at the transfer station from the main line M to the branch line B1. The device RC may be of any suitable construction which prevents operation of the transfer device to permit trucks to pass by the transfer station and continue on the main line M, and which is arranged to be actuated to start a transfer operation when a truck selected for routing to the branch line B1 approaches the transfer station. Many suitable devices for accomplishing this function are available. The exact structure of such devices form no part of the present invention; however, reference is made to United States Patent No. 2,816,516, issued December 17, 1957, on the application of W. J. Diehl, for an example of the same.

It is believed that the operation of the electrical control system of FIGS. 21 and 22 will be best understood by combining the descriptions of the electrical system and the operation of the transfer mechanism.

The normal or rest position of the transfer mechanism is assumed by the parts when the piston rod 182 of the motor 176 is in its fully extended position. At this time, the slide member 188 is at the position shown in FIG. 4 and schematically in FIG. 19. The engagement between the longitudinal side edge of the ram plate 202 and the pivotal deflecting arm 162 maintains such arm in a retracted position clear of the path of the tow pins 32 moving along the main path M. The operating arm 148 of the limit switch 134 is disposed in a position where it extends entirely across the transfer path T1. The various contacts of FIG. 22 will be in the positions shown at this time.

Referring now to FIG. 19, movement of a floor truck 30 to the right along the main path M from the illustrated position causes the tow pin 32 of the truck to engage the striker of limit switch SLS1 which causes the contacts SLS1a (FIG. 22) to close. Assuming that the truck is to be transferred to the branch line B1, the transfer cycle initiating device RC will be actuated at this time to close the contacts RCa simultaneously with the closing of contacts SLS1a by the tow pin 32 of the truck. When both contacts RCa and SLS1a are closed, a circuit is completed across the supply lines through contacts 134a which are closed at this time by virtue of the position of the operating arm 148 of the limit switch 134 across the transfer path T1, and also through a time delay opening relay TRF. The relay TRF is of a type which actuates immediately upon energization and retains its actuated condition for a predetermined time interval after the relay is deenergized.

Energization of the relay TRF therefore immediately closes its associated contacts TRFa which in turn complete a circuit across the supply lines through the normally closed contacts PMRd and a pump motor control relay PMF. Energization of the relay PMF closes its associated contacts PMFa, PMFb and PMFc which connect the pump motor 252 to supply lines L1, L2 and L3 (FIG. 21) to cause the pump motor 252 to drive in a direction in which the pump 250 supplies fluid under pressure to the rod end of the motor 176 to retract the piston rod 182 into the cylinder.

It should be noted at this time that the contacts SLS1a and RCa open immediately after the tow pin 32 passes beyond the location of the limit switch SLS1 and the remote control device RC. However, because of the delayed opening characteristics of the relay TRF, the contacts TRFa remain closed for a predetermined time interval after the opening of the circuit through the relay TRF. This time delay opening characteristic of the contacts TRFa is selected to be such as to maintain the pump motor control relay PMF energized to permit the pump motor 252 to drive for a sufficient period of time to fully retract the rod 182 into the cylinder of the motor 176. The rate at which the rod 182 is retracted into the cylinder is such that the rod is fully retracted before the tow pin 32 of the truck which initiated the actuation is moved from the location of the remote control device RC to the intersection of the transfer path T1 and the main path M.

When the piston rod 182 is fully retracted, the slide member 188 of the transfer device is located in the position shown in FIG. 6. During movement of the slide member 188 from the FIG. 4 position to the FIG. 6 position, the tip 290 of the plate 226 engages the surface 292 of the deflecting arm 162 and causes the arm 162 to pivot from the position shown in FIG. 4 to the position shown in FIG. 6. As shown in FIG. 6, this pivoting action locates the arm 162 in a position to intercept the tow pin 32 of the floor truck to deflect the pin 32 from the main path M into the transfer path T1.

The pusher dog assembly 34 driving the tow pin 32 advances the latter until it strikes the deflector arm 162. The tow pin 32 is then removed from the notch 46 of the pusher dog and deflected into the transfer path T1 by the deflector arm 162. As it enters the transfer path T1 the tow pin 32 is driven by the rearwardly inclined pusher dog surface 48, and at the same time the tow pin 32 is raised by the upwardly inclined pusher dog surface 44 to permit the pin to pass through the cut out or notch 130 in the inner track 52 without jamming against the track below the cut out, as a longer pin could do without the benefit of the inclined surface 44. Before the tow pin 32 leaves the side of the pusher dog assembly the rearwardly inclined surface 48 thereof moves it a sufficient distance along the transfer path T1 to engage and rotate the striker arm 148 of the switch 134. Thus, the pin 32 is positively transferred by the pusher dog assembly from the main line M to a position in the transfer path T1 causing rotation of the switch striker arm 148 and the momentum of the truck is not required to effect this transfer.

This rotation of the arm 148 actuates the limit switch 134 to open the contacts 134a and simultaneously close the contacts 134b. As shown in FIG. 22, the closing of the contacts 134b completes a circuit across the supply line through parallel connected relays LR2A and TRR. The relay TRR is of a construction and function similar to the relay TRF described above and operates to actuate the contacts TRRa in the same manner as the relay TRF operates to actuate the contacts TRFa.

The closing of the contacts TRRa completes a circuit through the normally closed contacts PMFd and a second pump motor control relay PMR. The energization of relay PMR closes its associated contacts PMRa, PMRb and PMRc (FIG. 21) to connect the pump driving motor 252 to supply lines L1, L2 and L3 in a manner which causes the motor 252 to drive in a reversed direction. It will be noted that each of the relays PMF and PMR are respectively connected in series with a set of normally closed contacts PMRd and PMFd. Each of these contacts is operated by the associated relay to prevent actuation of both of the relays PMF and PMR at the same time. In other words, if relay PMF is still energized at the time the contacts TRRa are closed, the relay PMR cannot be energized since the contacts PMFd will be held open as long as the relay PMF is energized. The contacts PMRd operate in the same manner to prevent energization of the relay PMF at any time when the relay PMR is energized.

When the pump motor 252 drives in the reversed direction, it causes the pump 250 to force fluid under pressure out of the head end of the cylinder of the motor 176, thereby driving the piston rod 182 toward its fully extended position. FIG. 5 shows the position of the slide member 188 at one point during this movement of the rod 182 toward its extended position.

It will be noted that the tow pin 32 is engaged by the inclined edge 208 of the ram plate 202. It is believed apparent from FIG. 5 that movement of the slide member 188 to the right will cause the pin 32 to be driven, due to the inclination of the edge 208, toward the branch path B1. As the pin 32 is moved in this direction, the ramp plate 120 engages the lower surface of the pin and elevates it so that the pin may clear the inner rail 52' of the branch path B1, see FIG. 10. The transverse extent of the inclined edge 208 is sufficient to positively drive the pin 32 over the upper flange of the inner rail 52' to the cut out 131 to permit the pin to drop within the space between the opposed rails 52' of the branch path B1.

As noted previously, the cut out 131 is so dimensioned that the tow pin 32 is carried over the path of the wheels of the pusher dog assemblies traveling along the path B1 before it drops between the rails. In fact, the dimension of the cut out 131 is such that the tow pin must be moved over the path of the converging wings 42 of the pusher dog assemblies before it will drop through the cut out. Since the bottom of the tow pin is lifted by the ramp plate 120 over the side and wheels of the pusher dog assemblies there is no possibility of the tow pin being pushed by the ram plate 202 against the side of a dog. Therefore, the tow pin may be moved from the transfer path T1 to the path B1 without regard to the position of the dogs in the path B1. In other words, the transfer mechanism need not be synchronized with the movement of the dogs in the path B1. Although the edge 208 of the ram plate does not drive the pin 32 completely into the center of the path B1, the pin 32 is positively driven into the path of a wing 42 or a vertical surface 48 of a dog on the driving chain associated with the path B1. The momentum imparted to the truck by the ram plate 202 is generally sufficient to carry the pin 32 to the position shown in FIG. 4, however, should the pin stop short of this position, engagement of a wing 42 or a vertical surface 48 of the dog with the pin will positively drive the pin against the edge 80 of the cover plate and the inclination of the edge 80 will force the pin 32 out into the center of the path B1.

Movement of the piston rod 182 to its fully extended position also causes the tip 296 of the ram plate 202 to engage the tail 298 of the deflector arm 162 and rotate the deflector arm 162 from the position shown in FIG. 6 to the position shown in FIG. 4 closing off the transfer path T1 and preventing the entry of an unscheduled tow pin.

FIG. 4 shows the slide member 188 completely returned to its rest position with the piston rod 182 fully extended. During movement of the slide member 188 between the position of FIG. 5 and the position shown in FIG. 4, the plate 210 engages the projecting pin 154 on the arm 148 of the limit switch 134 to rotate the arm 148 from the position of FIG. 5 to the position of FIG. 4. This action of the arm 148 opens the contacts 134b and closes the contacts 134a thereby opening the circuit to the relays TRR and LR2A. Deenergization of the relay TRR permits its contacts TRRa to open after a predetermined time interval to thereby open the circuit to the pump driving motor 252.

In addition to the relays described above, four latching relays are employed in the control system to prevent the passage of more than one truck through the transfer station at a given time. The operation of these relays is as follows: When a truck being transferred passes into the transfer path T1 and rotates the arm 148 of the limit switch 134 to its FIG. 5 position, the latching relay LR2A is energized simultaneously with the energization of the relay TRR. The relay LR2A, when energized, closes its associated contacts LR2a which are connected across the supply lines in series with the contacts SLS1a and a second latching relay LR1A. At the time the contacts LR2a are closed, the contacts SLS1a are normally open since the truck has passed beyond the location of the striker of the switch SLS1. The contacts LR2a remain closed, even upon the subsequent deenergization of the relay LR2A, until a third latching relay LR2B is energized. Relay LR2B is not energized until the tow pin 32 engages the second safety limit switch SLS2 located at the exit of the transfer station on the branch path B1.

Should a second truck follow too closely behind the truck being transferred and strike the limit switch SLS1 before the contacts LR2a are opened, the relay LR1A will become energized. When this relay is energized, it opens normally closed contacts LR1a which are connected in series with the electrical supply lines to the motor 287 which is employed to drive the chain 36 associated with the main path M. When the motor 287 is deenergized, the chain 36 is stopped and hence the second truck cannot be driven further into the transfer station. Energization of the relay LR1A also closes contacts LR1b to operate an indicator lamp IL, or other suitable signaling device, to inform the operator of this condition. The system will be automatically reset when the limit switch SLS2 is contacted by the tow pin 32 of the truck being transferred to close contacts SLS2a since this will energize a fourth relay LR1B which will return the contacts LR1a to their normally closed position, and simultaneously open the contacts LR1b. The relay LR2B is simultaneously energized to open the contacts LR2a.

While we have described but one embodiment of our invention, it will be apparent to those skilled in the art that the disclosed embodiment is capable of modification. Therefore, the foregoing specification is to be considered exemplary rather than limiting and the true scope of our invention is that defined in the following claims.

Having thus described the invention, we claim:

1. In a floor truck propelling system including two chains traveling below the floor level in closed paths with one portion of each of the two paths arranged in adjacent parallel relationship at a given location in said system, a propelling dog connected to each of said chains, and a floor truck having a tow pin engageable with either one of said dogs for propelling movement thereby, the combination comprising stationary means at said given location defining a transfer path between said parallel portions of said chain paths, first means including a member movable between two operative positions, said member when in one of said operative positions obstructing the path of movement of a tow pin engaging the dog of one of said drive chains and employing the movement of said one chain for disengaging said tow pin from the dog of that chain and for deflecting said tow pin into the adjacent end portion of said transfer path, said member when in the second of said operative positions obstructing the adjacent end portion of said transfer path, and second means responsive to the movement of a tow pin through said adjacent end portion of said transfer path and including mechanism movable independently of the member of said first means for engaging the tow pin and moving the same through the remainder of the transfer path into the path of the dog on the other chain, the movement of the mechanism of said second means effecting the movement of the member of the first means into its said second operative position.

2. In a floor truck propelling system as defined in claim 1 further characterized by the mechanism of the second means including a slide mounted on said stationary means for movement between first and second positions, and means on said slide engageable with said tow pin to move the same from the adjacent end portion of said transfer path, through the following portion of said latter path, and into the path of the dog on the other chain when said slide is moved from said first position to said second position.

3. A floor truck propelling system comprising, two chains traveling below the floor level in closed paths with one portion of each of the two paths arranged in adjacent parallel relationship at a given location in said system, a plurality of spaced propelling dog assemblies connected to each of said chains, a floor truck having a tow pin vertically adjustable for movement into and out of propelling relationship with any one of said dog assemblies, each of said dog assemblies including a body having a vertically extending, forwardly opening notch therein for receiving said tow pin, when the latter is in normal propelling relationship therewith, and a generally laterally extending surface adjacent one side of said notch, stationary means at said given location defining a transfer path between said parallel portions of said chain paths, a deflector at said given location for intercepting the tow pin as it is propelled by a dog assembly on one of said chains and movable for guiding said tow pin from the notch of that dog assembly to the adjacent end portion of said transfer path, said tow pin being propelled throughout said guided movement, after leaving said notch, by engagement with the said laterally extending surface of the dog assembly, and means in addition to said deflector and partaking of a different direction of movement upon the arrival of a tow pin in said adjacent end portion of said transfer path for engaging the tow pin and moving the same through the remainder of the transfer path into the path of the dog assemblies on the other chain.

4. The combination as defined in claim 3 further characterized by said deflector being movable into one position in the path of the tow pin as it is propelled by a dog assembly on said one chain into a second position out of the said path of the tow pin, said two positions of the deflector functioning to effect selective transfer of said tow pin between said two chain paths.

5. A floor truck propelling system comprising two chains traveling below the floor level in closed paths with one portion of each of the two paths arranged in adjacent parallel relationship at a given location in said system, a propelling dog connected to each of said chains, each of said dogs having a vertically extending notch therein and a generally laterally extending surface adjacent one side of said notch, a floor truck having a depending tow pin engageable with the notch in either one of said dogs for propelling movement thereby, stationary means at said given location defining a transfer path between said parallel portions of said chain paths, a deflector pivotally movable into and out of the path of said tow pin as said pin is propelled by the dog on one of said chains, said deflector when moved into said path being positioned to intercept said tow pin and to guide the same from said latter dog to the adjacent end portion of said transfer path, the laterally extending surface of said latter dog being engageable with said tow pin, after it leaves said notch, to propel the tow pin throughout such guided movement, a slide mounted upon said stationary means for reciprocating movement relative to said deflector between first and second positions, and means on said slide for engaging said tow pin and for moving the same from said adjacent end portion, through the remainder of the transfer path, and into the path of a dog on the other chain when said slide is moved from said first to said second position, said means on the slide also engaging said deflector for moving the latter out of the path of said tow pin to a position where the deflector obstructs the said adjacent end portion of the transfer path.

6. The combination as defined in claim 5 further characterized by means for reciprocating said slide between said two positions, and means responsive to the arrival of a tow pin in said adjacent end portion of said transfer path for actuating said slide reciprocating means to drive said last mentioned means from said first to said second position.

7. The combination as defined in claim 5 further characterized by means on the slide for pivoting the deflector into said path of said tow pin upon reciprocation of the slide from said second to said first position and for pivoting the deflector out of said path of the tow pin upon reciprocation of the slide from said first to said second position.

8. The combination as defined in claim 5 further characterized by the deflector when positioned out of the path of the tow pin being located across the entrance of said transfer path to prevent the entry of the pin to said latter path.

9. A floor truck propelling system comprising two chains traveling below the floor level in closed paths with one portion of each of the two paths arranged in adjacent parallel relation at a given location in said system, a plurality of spaced propelling dog assemblies connected to each of said chains, a floor truck having a tow pin vertically adjustable for movement into and out of propelling relationship with any one of said dog assemblies, each of said dog assemblies including a body having a vertically extending, forwardly opening notch therein for receiving said tow pin when the latter is in normal propelling relationship therein, and a generally laterally extending surface adjacent on side of said notch, stationary means at said given location defining a transfer path between said parallel portions of said chain paths, a deflector at said given location for intercepting the tow pin as it is propelled by a dog assembly on one of said chains and for guiding said tow pin from the notch of that dog assembly to the adjacent end portion of said transfer path, said tow pin being propelled throughout said guided movement, after leaving said notch, by engagement with said laterally extending surface of the dog assembly, means actuated upon the arrival of the tow pin in said adjacent end portion of said transfer path for engaging the tow pin and moving the same through the remainder of the transfer path into the path of the dog assemblies on the other chain, a ramp on said stationary means for lifting the tow pin above the paths of the dog assemblies on said other chain as the tow pin is moved through said transfer path, and means permitting said tow pin to drop vertically from such elevated position and into the path of said latter dog assemblies as it leaves said transfer path.

10. A floor truck propelling system comprising two chains traveling below the floor level in closed paths with one portion of each of the two paths arranged in adjacent parallel relationship at a given location in said system, a plurality of spaced propelling dog assemblies connected to each of said chains, a floor truck having a tow pin vertically adjustable for movement into and out of propelling relationship with any one of said dog assemblies, each of said dog assemblies including a body having a vertically extending forwardly opening notch therein for receiving said tow pin when the latter is in normal propelling relationship therewith, and a generally laterally extending surface adjacent one side of said notch, stationary means at said given location defining a transfer path between said parallel portions of said chain paths, a deflector at said given location for intercepting the tow pin as it is propelled by a dog assembly on one of said chains and for guiding said tow pin from the notch of that dog assembly to the adjacent end portion of said transfer path, said tow pin being propelled throughout said guided movement, after leaving said notch, by engagement with said laterally extending surface of the dog assembly, means actuated upon the arrival of the tow pin in said adjacent end portion of said transfer path for engaging the tow pin and moving the same through the remainder of the transfer path into the path of the dog assemblies on the other chain, each of said dog assemblies including a supporting wheel at each side of its body in laterally spaced relation to the notch therein, a ramp on said stationary means for lifting the tow pin above the paths of the wheels on the dog assemblies of said other chain as the tow pin is moved through said transfer path, and means permitting said tow pin to drop vertically from such elevated position into the path of said latter dog assemblies at a point located between the paths of the wheels thereof.

11. A floor truck propelling system comprising two chains traveling below the floor level in closed paths with one portion of each of the two paths arranged in adjacent parallel relationship at a given location in said system, a propelling dog connected to each of said chains, each of said dogs having a vertically extending notch therein and a generally laterally extending surface adjacent one side of said notch, a floor truck having a depending tow pin engageable with the notch in either one of said dog assemblies for propelling movement thereby, stationary means at said given location defining a transfer path between said parallel portions of said chain paths, a deflector movable into and out of the path of said tow pin as it is propelled by the dog on one of said chains, said deflector when in said latter path being positioned to intercept said tow pin and to guide the same from said latter dog to the adjacent end portion of said transfer path, the laterally extending surface of said latter dog being engageable with said tow pin, after it leaves said notch, to propel the tow pin throughout said guided movement, a slide mounted upon said stationary means for movement between first and second positions, means on said slide for engaging said tow pin for moving the same from said adjacent end portion, through the remainder of the transfer path, and into the path of a dog on the other chain when said slide is moved from said first to said second position, said means defining a transfer path including a forwardly inclined guide surface extending between the two parallel chain paths, the slide member being mounted for movement on said means along a path located between and parallel to said parallel chain paths, and said means for engaging the tow pin including a ram member located on the slide and having a forward edge which progressively moves across the inclined guide surface as the slide is moved from said first to said second position to drive the tow pin along said inclined guide surface.

References Cited in the file of this patent
UNITED STATES PATENTS

| | | |
|---|---|---|
| 251,317 | Terry | Dec. 20, 1881 |
| 843,896 | Korns | Feb. 12, 1907 |
| 2,660,127 | Boyko et al. | Nov. 24, 1953 |
| 2,714,355 | Benson | Aug. 2, 1955 |
| 2,782,727 | King | Feb. 26, 1957 |
| 2,803,198 | McCaul et al. | Aug. 20, 1957 |
| 2,878,758 | D'Altrui | Mar. 24, 1959 |

FOREIGN PATENTS

| | | |
|---|---|---|
| 1,135,906 | France | Dec. 22, 1956 |